United States Patent
Zoeckler et al.

(10) Patent No.: US 8,391,849 B2
(45) Date of Patent: Mar. 5, 2013

(54) OUTBOUND CALL CORRECTION FOR NON-TELEMATIC MOBILE DIRECTORY NUMBER DIALED BY TELEMATIC OPERATOR

(75) Inventors: Dennis L. Zoeckler, Brighton, MI (US); Richard J. Moll, Clarkston, MI (US)

(73) Assignee: General Motors LLC., Detroit, MI (US)

( * ) Notice: Subject to any disclaimer, the term of this patent is extended or adjusted under 35 U.S.C. 154(b) by 321 days.

(21) Appl. No.: 12/715,137

(22) Filed: Mar. 1, 2010

(65) Prior Publication Data

US 2011/0212713 A1    Sep. 1, 2011

(51) Int. Cl.
*H04M 3/42*    (2006.01)

(52) U.S. Cl. .................. 455/415; 455/412.1; 455/412.2; 455/414.1; 455/423; 701/234; 701/537; 701/540; 340/870.11

(58) Field of Classification Search ............... 455/412.1, 455/412.2, 414.1, 423; 340/870.11; 701/24, 701/537, 540

See application file for complete search history.

(56) References Cited

U.S. PATENT DOCUMENTS

| | | | | |
|---|---|---|---|---|
| 5,895,436 A | * | 4/1999 | Savoie et al. ................. | 701/468 |
| 6,697,637 B1 | * | 2/2004 | Willey .......................... | 455/551 |
| 7,756,252 B2 | * | 7/2010 | Zoeckler et al. ............. | 379/9.04 |
| 7,873,345 B1 | * | 1/2011 | Dunne et al. ................ | 455/404.1 |
| 2001/0040506 A1 | * | 11/2001 | Boulay et al. ................ | 340/539 |
| 2004/0012501 A1 | * | 1/2004 | Mazzara et al. ......... | 340/870.11 |
| 2006/0052092 A1 | * | 3/2006 | Schwinke et al. ............ | 455/415 |
| 2006/0079219 A1 | * | 4/2006 | Nicolini ........................ | 455/423 |
| 2006/0217109 A1 | * | 9/2006 | Sobb et al. .................. | 455/414.1 |
| 2007/0263833 A1 | * | 11/2007 | Zoeckler et al. ......... | 379/221.03 |
| 2008/0119983 A1 | * | 5/2008 | Inbarajan et al. ............... | 701/36 |
| 2008/0120124 A1 | * | 5/2008 | Zoeckler et al. .................. | 705/1 |

* cited by examiner

*Primary Examiner* — Jinsong Hu
*Assistant Examiner* — Qun Shen

(57) ABSTRACT

The described principles provide a method and system for enabling a telematic operator to determine that an outbound call has been placed to a non-telematic mobile directory number by the telematic operator in error. In one aspect, the invention allows the telematic operator to create an identification of all non-telematic MDN's stored by the wireless carrier which the telematic operator continues to believe are active and are associated with a pending transaction. Improved synchronization of records between the wireless carrier and telematic operator is provided to minimize incidents involving transactional differences between MDN values stored by the wireless carrier and telematic operator when an assigned MDN is processed in error between the two entities. The use of unique modem telephone numbers by the telematic operator allows identification of the affected MDN (by the telematic operator) while providing the customer data privacy needed for the wireless carrier.

11 Claims, 4 Drawing Sheets

| DATE | TIME | MDN | ESN | TC | CCI | DIR | Called Number | CPN | Outpulsed Number | SOU |
|---|---|---|---|---|---|---|---|---|---|---|
| 3/1/10 | 14:24:33 | | bbc345ae | 0 | 70 | MT | 9723721723 | | | 17 |
| 3/1/10 | 15:17:12 | | ef12cbad | 0 | be | MT | 9723721700 | | | 12 |
| ... | ... | ... | ... | ... | ... | ... | ... | ... | ... | ... |

OUTBOUND CALL CORRECTION FOR NON-TELEMATIC MOBILE DIRECTORY NUMBER DIALED BY TELEMATIC OPERATOR

BACKGROUND OF THE INVENTION

Although both cellular phones and vehicle telematics devices can use the same radio frequency spectrum for communications, there are numerous differences in how such devices are used. For example, telematics units, while sometimes used for interpersonal communications, are also frequently employed to obtain navigational assistance and other services that require receiving a call from a call center operator. Users often initiate such calls, but there are numerous occasions when the operator is required to initiate a call to the telematics unit.

For example, during interactions involving telematic operator transaction processing, the telematic operator may place an outbound call via a modem to the telematic device using a mobile dialing number (MDN) that the operator has recorded for the device. However, if the intended vehicle MDN dialed by the telematic operator has been recycled by the wireless provider to a handset subscriber, the telematic operator transaction system cannot distinguish between the vehicle response and a handset response.

In such cases, a handset subscriber receives an unwanted call, and the process that the telematic operator intended to execute does not occur. Such mistaken calls can generate consumer dissatisfaction that only becomes known to the telematic operator when the modem call to the mistaken MDN is alleged by the handset owner as an unwanted call. However, this situation is difficult to avoid since the wireless carrier may be prohibited from providing a third-party (i.e., the telematic operator) with stored values not related to an account of record whereby the MDN is assigned to a handset subscriber.

Currently, there is no system available for a telematic operator to determine at the time of the outbound call if a targeted MDN value stored relative to the device has been recycled by the wireless carrier to a handset subscriber. Thus, the primary identification of a mistaken MDN condition occurs only after a consumer complaint is lodged by the consumer who is the recipient of the call made by the telematic operator to the affected MDN. Notification of the mistaken MDN sometimes also occurs when a business transaction involving both the wireless carrier and telematic operator shows the MDN value to have been reassigned without the knowledge of the telematic operator.

However, for many if not most situations, the mistaken MDN will have already resulted in customer dissatisfaction by the time it is discovered. Thus, a system and method are needed for enabling a telematic operator to recognize an MDN that has been reassigned from a telematics unit to a handset subscriber.

BRIEF SUMMARY OF THE INVENTION

The invention provides a system and apparatus for enabling a telematic operator to determine that an outbound call has been placed to a non-telematic mobile directory number by the telematic operator. In particular, in one aspect, the invention provides an identification of non-telematic MDN's stored by the wireless carrier which the telematic operator continues to believe are active and are associated with a pending transaction. In another aspect, a reduction in call connectivity costs is generated by minimizing the number of calls placed to non-telematic MDN's.

The described principles also beneficially reduce consumer complaints that must be handled by the wireless carrier or the telematic operator when an MDN that is active to a handset subscriber is thought by the telematic operator to be active to a telematic device. In a further aspect, improved synchronization of billing or business records between the wireless carrier and telematic operator is provided. Moreover, the described technique avoids incidents involving transactional differences between MDN values stored by the wireless carrier and telematic operator when an assigned MDN is processed in error between the two companies.

In an aspect, corrective action by the telematic operator is enabled by receipt of a daily report from the wireless carrier. Moreover, the use of unique modem telephone numbers by the telematic operator allows identification of the affected MDN (by the telematic operator) while providing the customer data privacy needed for the wireless carrier. This alleviates disclosure to a third-party and enables swift correction of the outbound calls to an affected MDN.

In another aspect of the described system and method, the daily production report is used by the telematic operator to correct, suspend, delete, and/or modify business records involving an invalid MDN value stored by the telematic operator.

Other objects and advantages of the invention will become apparent upon reading the following detailed description and upon reference to the drawings.

BRIEF DESCRIPTION OF THE SEVERAL VIEWS OF THE DRAWINGS

FIG. 4 is a data structure diagram showing a report listing compiled across multiple calls or attempted calls, for use by the telematic operator in remedying the cause and/or affect of mistaken telematic operator calls according to an aspect of the principles described herein.

DETAILED DESCRIPTION OF THE INVENTION

Before discussing the details of the invention and the environment wherein the invention may be used, a brief overview is given to guide the reader. In general terms, not intended to limit the claims, the invention is directed to solving problems that can occur when a mobile dialing number (MDN) that was previously associated with a telematic unit is reassigned by a wireless provider to a handset subscriber, e.g., a cell phone user, instead. In such a circumstance, the telematic operator may be unaware of the reassignment, and may attempt to contact the telematic unit at the reassigned number, resulting in an unexpected call to the handset subscriber to whom the number was newly assigned. To eliminate the wasted connection costs and the consumer dissatisfaction that such unwanted calls can generate, the described system provides a mechanism for informing the telematic operator of such reassignments. This is carried out while maintaining the privacy of user information so as to meet privacy requirements for the wireless provider, while still reducing consumer complaints and minimizing misconnection costs.

Figure 1:
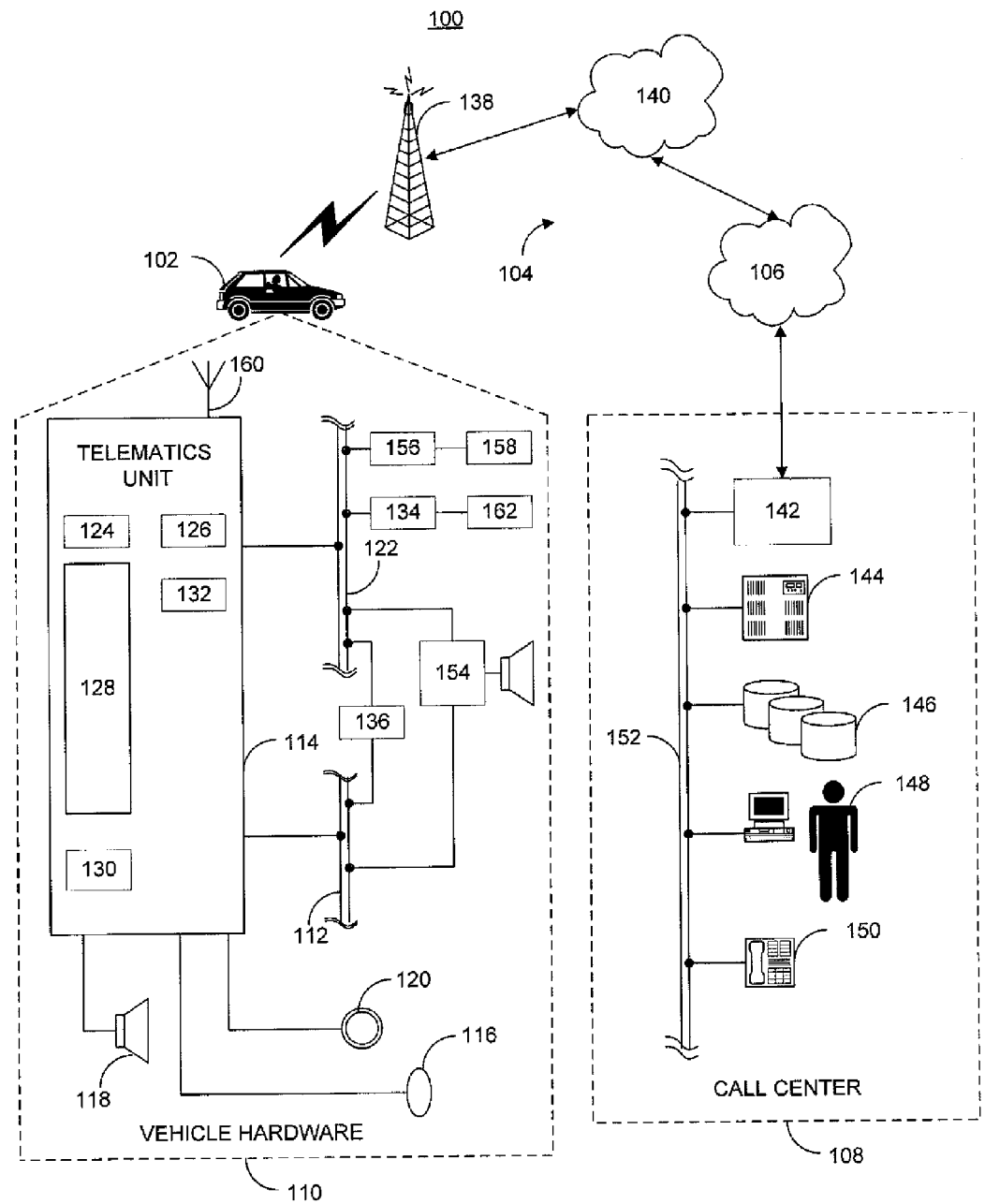
FIG. 1 is a schematic diagram of an operating environment for a mobile vehicle communication system.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) 180 of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include powertrain control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
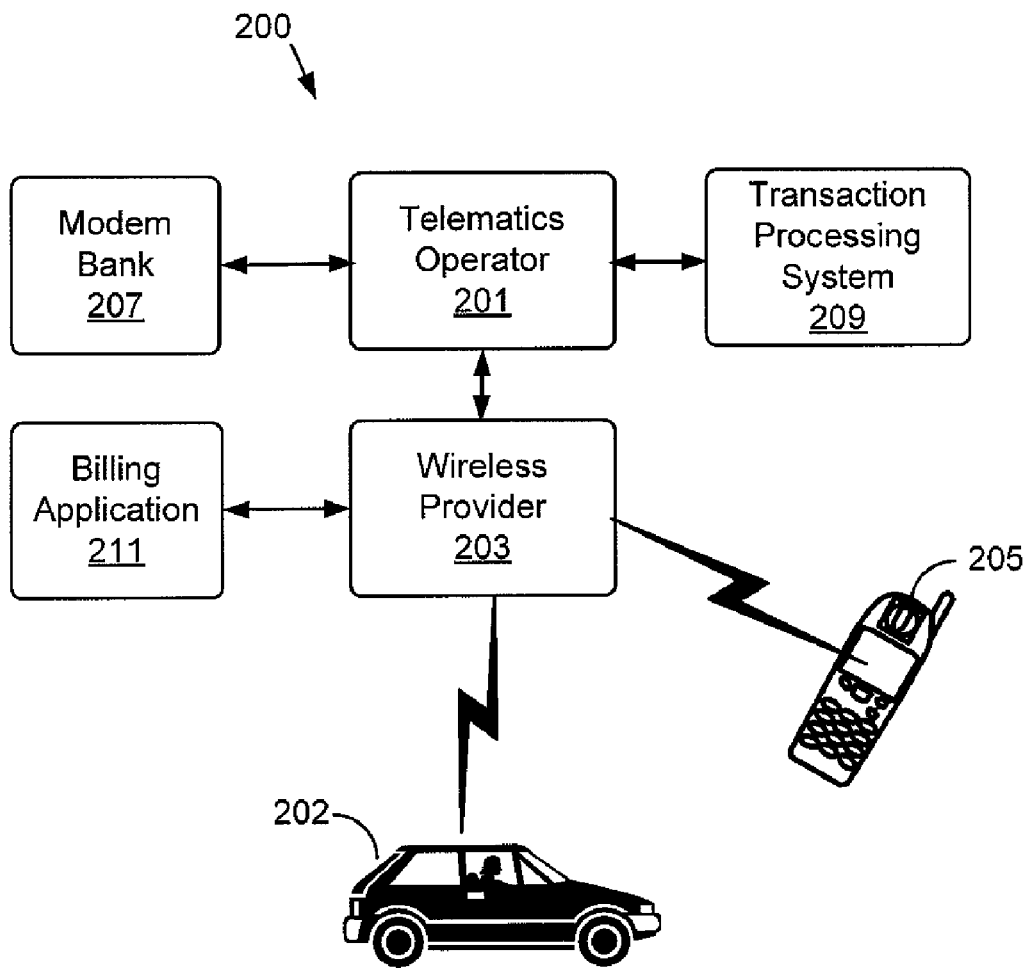
FIG. 2 is a schematic illustration of the environment within which the described principles are implemented, including the primary components, their relationships, and the primary structures generated and used by the system.

Turning to the details of the system operating within the described environment, an exemplary logical architecture 200 is illustrated in schematic form in FIG. 2 to show the primary components, their relationships, and the primary structures generated and used by the system. The illustrated system 200 includes a telematic operator 201 as described above as well as a wireless provider 203. The telematic operator 201 may for example utilize the wireless provider 203, or the facilities of the wireless provider 203, to contact telematics subscribers such as a telematics unit associated with vehicle 202. The wireless provider 203 is also able to connect to non-telematic devices such as represented by cell phone 205. Moreover, the telematic operator 201 may inadvertently contact such subscribers as noted above, such as when an MDN previously associated with a telematic subscriber is reassigned to a non-telematic device.

In addition to the features just described, the environment 200 also includes a modem bank 207 for use by the telematic operator 201, and a transaction processing system 209 linked to the telematic operator 201 to track transactions between the telematic operator 201 and any called entities such as telematics devices. The wireless provider 203 is associated with a billing application 211, which may be local or remote with respect to the physical facilities of the wireless provider 203. The function of the billing application 211 will be elucidated below, but in overview, the billing application 211 is used in one aspect to associate MDNs with ESNs.

Within a typical cellular environment, one challenge for the telematic operator 201 as it attempts to contact a telematics subscriber is to ensure that a dialed MDN indeed corresponds to the target device associated with the MDN within the information available to the telematic operator 201. In keeping with this goal, it is important for the telematic operator 201 to be able to determine when a stored MDN value is no longer active on the wireless carrier network (e.g., via normal subscription cancellation with the telematic provider) and a cancelled MDN transaction is processed with the wireless carrier 203.

Similarly, it is important to determine when the records of the telematic operator 201 and the billing records of the wireless carrier 203 are out-of-sync, causing the telematic operator 201 to continue to direct outbound calls to the affected MDN value stored in the vehicle 202. A root cause of out-of-sync records occurs when the wireless carrier 203 creates a condition involving the recycling of the vehicle MDN to a handset owner without the knowledge of the telematic operator 201, It can also occur that the telematic device stored in the vehicle 202 is able to call the telematic operator 201 and update stored values in the telematic operator databases, causing the transaction processing system 209 to mistakenly infer that the telematic device MDN is now active on the wireless carrier network. A similarly condition can arise through the misprogramming of an MDN into the telematic device during the programming of the telematic device.

Regardless of the cause of the mismatched records, the system uses one or more unique calling party numbers assigned to a modem bank of the telematic operator in an aspect of the described principles to generate the data needed to correct erroneous MDN entries. The modems of the modem bank 207 are identified by the wireless carrier 203 as either an "ANI" (automatic number identification) and/or "CPN" (calling party number) value in each outbound call received by the wireless carrier 203 main transit switching office ("MTSO"). The ANI/CPN allows the wireless carrier 203 to distinguish between a call from the unique telematic operator 201 to an MDN in which the wireless carrier 203 will attempt to perform a connection authentication. If the dialed MDN is active by the wireless carrier 203, the call attempt is delivered to the handset or telematic device which the wireless carrier deems to be active at the time of the call attempt. In cases where the MDN is not assigned to a telematic device (at the wireless carrier 203), the call is delivered to a handset subscriber managed by the wireless carrier 203. In an alternative configuration, the mistaken call is blocked and is not passed to the handset subscriber.

In an aspect of the described system, the wireless carrier 203 matches all outbound call attempts by the telematic operator 201 to all MDN's not assigned to the telematic operator account(s) within the billing system, and in situations where the MDN value dialed by the telematic operator 201 is recorded by the wireless carrier 203 to be assigned to a non-telematic device, the wireless carrier 203 returns all associated ESN's from the telematic operator billing accounts regardless of activation and deactivation date. In accordance with one feature, these responses are accumulated into a daily report by the wireless carrier 203 and transmitted to the telematic operator 201, e.g., for research and resolution.

Upon the telematic operator 201 being provided with the appropriate ESN values as stored by the wireless carrier 203 within its billing records, the telematic operator 201 will decode the ESN values, to identify the device for which there are pending transactions. As noted above, such transactions may have been erroneously incurred, and once discovered, may lead to correction, deletion, or modification of the MDN value and associated transaction by the telematic operator.

Figure 3:
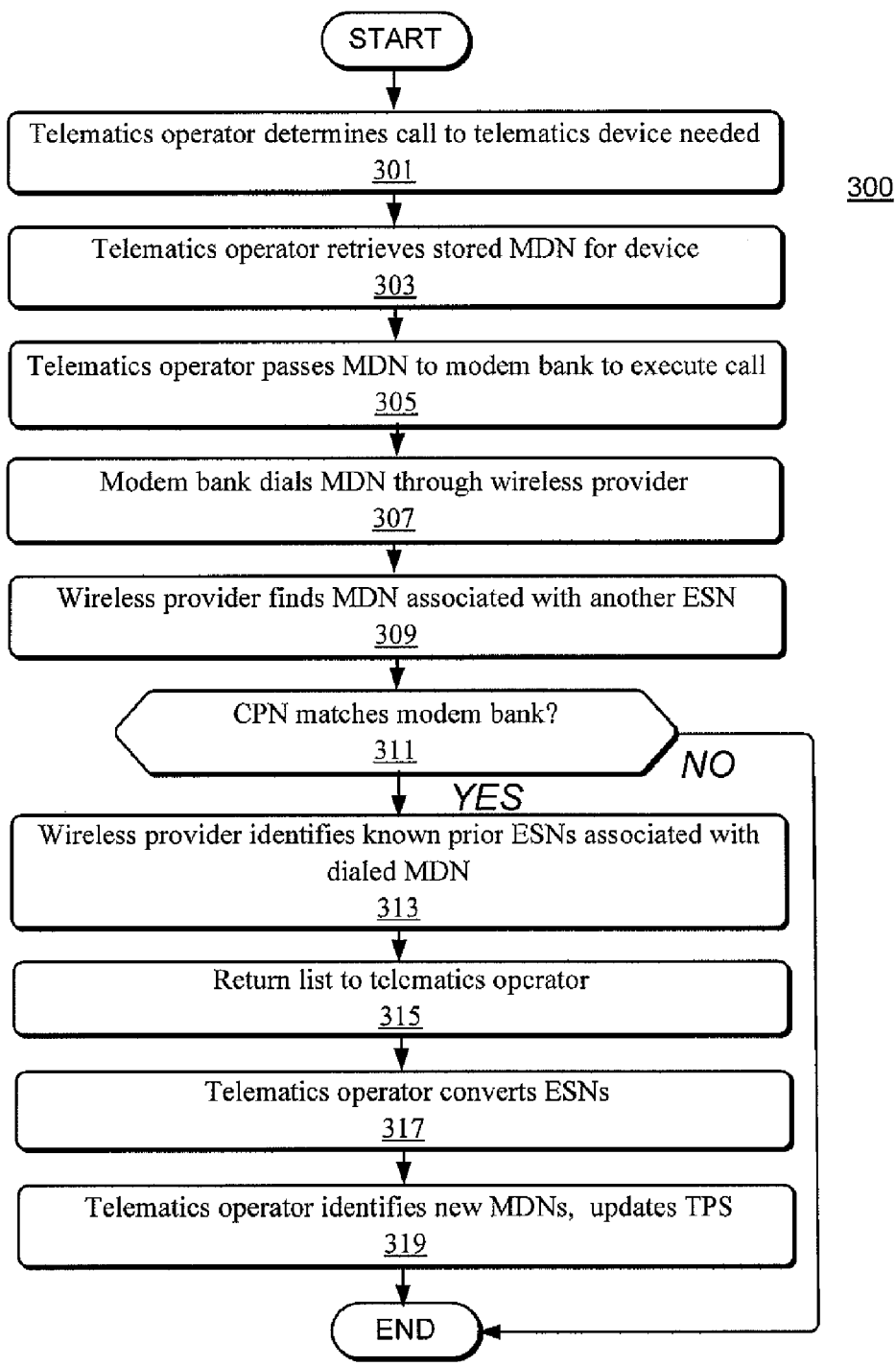
FIG. 3 illustrates a flow chart of a process for minimizing the frequency of misdirected telematic operator calls and for reversing the effects of such calls when made.

FIG. 3 illustrates a flow chart showing a process 300 for utilizing the illustrated architecture or similar arrangement to minimize the frequency of misdirected telematic operator calls and to reverse the effects of such calls when made. The process 300 commences at stage 301, wherein the telematic operator 201 determines that a call to a telematics device is needed, e.g., for testing or transactional purposes. The telematic operator initiates the call by retrieving the stored MDN for the device at stage 303, and passing the MDN to the modem bank 207 at stage 305 to execute the call.

A modem of the modem bank 207 dials the MDN through the wireless provider at stage 307. The information provided to the wireless provider by the model includes the MDN as well as an associated MIN (Mobile Identification Number) and ESN (Electronic Serial Number). The ESN is a unique identification number embedded in a wireless phone by the manufacturer. The transmitted MIN and ESN are selected based on the telematic operator's records, although these records may not be consistent with the wireless provider's records as discussed above.

At stage 309, the wireless provider checks the MDN, MIN and ESN against its records and finds that they are not valid within the MTSO ("Main Transit Switching Office"). In particular, the wireless provider finds that the specified MDN is associated with another ESN, i.e., another device. Subsequently at stage 311, the wireless provider determines whether the calling party is the telematic operator, i.e., whether the CPN matches the telematic operator modem bank. The identity of the caller may also be checked via an ANI as noted above. If the caller is not one of the modems of the modem bank 207, the process exits.

Otherwise, the process 300 continues to stage 313 wherein the wireless provider employs the billing application 211 to identify all known prior ESNs associated with the dialed MDN. This listing is returned to the telematic operator at stage 315. At stage 317, the telematic operator 201 receives the list and converts the ESNs on the transmitted list to corresponding MDNs, Station IDs (STIDs), and YIN values. From this conversion, the telematic operator identifies which telematics devices (ESNs) have new MDNs in stage 319, and executes appropriate correction to the transaction processing system 209. Corrective steps my include modifying the MDN associated with the dialed call so the telematic operator's MDN/ESN pair matches that of the wireless provider, and may also include deleting pending transactions that reflect an inadvertent call to a non-telematics device, as well as compiling a list of suspect STIDs.

Recalling stage 313, the ESN list may be for a single dialed MDN or may be a compiled list across multiple calls or attempted calls. The format of the list, or daily report may vary, but an exemplary format is shown in FIG. 4. In particular, the illustrated data structure 400 includes a number of fields for each call in question, i.e., each call from the modem bank to an MDN whose ESN does not match. The illustrated fields include a date field 401, a time field 403, and an MDN field 405. If the daily report 400 is originated from the wireless provider, it may not provide the MDN values in the MDN field 405, but the telematic operator can populate this field by matching ESNs to MDNs. To this end, the structure 400 also includes an ESN field 407.

In addition to the foregoing fields, the structure 400 also includes a TC field 409, CCI field 411, and DIR field 413. Finally, the illustrated structure 400 includes fields for the called number 415, the CPN 417, the outpulsed number 419, and the SOU 421. Again, the wireless provider 203 may not populate all of the these fields, but the remaining fields can be populated by the telematic operator upon receipt of the list 400.

Having received and completed the list 400, the telematic operator 201 is able identify any telematic device in which erroneous transactions are pending and to correct, delete, and modify the MDN and to correct, suspend, delete, and modify associated business records involving an erroneous MDN value stored by the telematic operator.

It will be appreciated that the disclosed system and method provide an improvement in current MDN reassignment resolution, and will lead to improved provider efficiency and customer satisfaction. It will also be appreciated, however, that the foregoing methods and implementations are merely examples of the inventive principles, and that these illustrate only preferred techniques. It is contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A computer-implemented method of identifying an inconsistency between records of a call center and records of a wireless provider, comprising:

identifying, by call center equipment, a telematics unit to which a call is to be placed;

identifying, by the call center equipment, a first Mobile Directory Number (MDN) associated with the telematics unit;

dialing, by the call center equipment, the first MDN via a first modem, wherein the dialed call is directed from the first modem through wireless provider equipment;

transmitting, by the call center equipment, a Mobile Identification Number (MIN) and an Electronic Serial Number (ESN) associated with the MDN according to the call center's records to the wireless provider equipment;

receiving, by the call center equipment, from the wireless provider equipment an indication that the first MDN is associated with a different ESN than the ESN associated with the first MDN in the call center's records, wherein the receiving further comprises:

receiving a list of prior ESNs associated with the first MDN according to the wireless provider's records; and in response to receiving the identification of the list of prior ESNs, converting, by the call center equipment, each of the prior ESNs of the list of prior ESNs to corresponding MDNs, Station Identifiers (STIDs), and VIN values.

2. The method according to claim 1, wherein the first modem is one of a plurality of modems in a modem bank.

3. The method according to claim 1, further comprising:
disassociating, by the call center equipment, the first MDN from the telematics unit and associating a second MDN with the telematics unit.

4. The method according to claim 1, further comprising:
identifying, by the call center equipment, based on the corresponding MDNs, Station Identifications (STIDs), and Vehicle Identification Number (VIN) values, one or more telematics devices that have been assigned new respective MDNs.

5. The method according to claim 4, further comprising:
correcting, by the call center equipment, records associated with a transaction processing system of the call center.

6. The method according to claim 5, wherein correcting records associated with the transaction processing system of the call center comprises modifying an MDN associated with the dialed call.

7. A computer-implemented method of identifying an inconsistency between records of a call center and records of a wireless provider, the method comprising:

receiving, by wireless provider equipment, a call, wherein the call includes a Mobile Directory Number (MDN) and an Electronic Serial Number (ESN) associated with the MDN;

determining, by the wireless provider equipment, that the MDN and ESN are not associated in records of the wireless provider;

determining, by the wireless provider equipment, that the call comes from call center equipment;

in response to determining that the MDN and ESN are not associated in records of the wireless provider and that the call comes from call center equipment, generating, by the wireless provider equipment, a listing of prior ESNs recorded with the wireless provider as being associated with the MDN; and transmitting, by the wireless provider, the generated listing to the call center equipment; wherein the generated listing is used by the call center equipment to convert each of the prior ESNs of the listing of prior ESNs to corresponding MDNs, Station Identifiers (STIDs), and VIN values.

8. The method according to claim 7, wherein determining that the call comes from call center equipment comprises:
determining that the call originated from a modem associated with the call center.

9. The method according to claim 8, wherein the originating modem is one of a plurality of modems in a modem bank.

10. The method according to claim 8, wherein determining that the call comes from call center equipment comprises:
recognizing a Calling Party Number (CPN) associated with the call as belonging to the modem associated with the call center.

11. A non-transitory computer-readable medium, part of wireless operator equipment, having computer-executable instructions stored thereon for identifying an inconsistency between records of a call center and records of a wireless provider, the computer-executable instructions comprising instructions for:

receiving a call, wherein the call includes a Mobile Directory Number (MDN) and an Electronic Serial Number (ESN) associated with the MDN;

determining that the MDN and ESN are not associated in records of the wireless provider;

determining that the call comes from call center equipment;

in response to determining that the MDN and ESN are not associated in records of the wireless provider and that the call comes from call center equipment, generating a listing of prior ESNs recorded with the wireless provider as being associated with the MDN; and transmitting the generated listing to the call center equipment; wherein the generated listing is used by the call center equipment to convert each of the prior ESNs of the listing of prior ESNs to corresponding MDNs, Station Identifiers (STIDs), and VIN values.

* * * * *